(12) United States Patent
Gyuricsko et al.

(10) Patent No.: US 8,387,924 B2
(45) Date of Patent: *Mar. 5, 2013

(54) ACTUATION SYSTEM FOR A LIFT ASSISTING DEVICE AND ROLLER BEARINGS USED THEREIN

(75) Inventors: Frederick S. Gyuricsko, Torrington, CT (US); Jay Phoenix, Bristol, CT (US); Arthur Gay, Torrington, CT (US); Nirad Patel, New Hartford, CT (US); Arnold Fredericksen, New Hartford, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/114,099

(22) Filed: May 24, 2011

(65) Prior Publication Data
US 2011/0220760 A1    Sep. 15, 2011

Related U.S. Application Data

(63) Continuation of application No. 12/201,062, filed on Aug. 29, 2008, now Pat. No. 8,025,257.

(60) Provisional application No. 60/992,746, filed on Dec. 6, 2007.

(51) Int. Cl.
*B64C 3/50*    (2006.01)

(52) U.S. Cl. ........................................ 244/214

(58) Field of Classification Search .................. 244/213, 244/214, 215, 218
See application file for complete search history.

(56) References Cited

U.S. PATENT DOCUMENTS

| | | | | | |
|---|---|---|---|---|---|
| 2,620,147 | A | * | 12/1952 | Cook, Jr. et al. | 244/216 |
| 4,399,970 | A | * | 8/1983 | Evans | 244/214 |
| 4,437,631 | A | * | 3/1984 | Martens et al. | 244/214 |
| 4,753,402 | A | * | 6/1988 | Cole | 244/210 |
| 4,838,503 | A | * | 6/1989 | Williams | 244/214 |
| 5,839,699 | A | * | 11/1998 | Bliesner | 244/214 |
| 6,149,105 | A | * | 11/2000 | Jaggard | 244/214 |
| 6,180,574 | B1 | * | 1/2001 | Ryan et al. | 508/106 |
| 8,025,257 | B2 | * | 9/2011 | Gyuricsko et al. | 244/214 |

* cited by examiner

*Primary Examiner* — Tien Dinh
*Assistant Examiner* — Keith L Dixon
(74) *Attorney, Agent, or Firm* — MKG, LLC

(57) ABSTRACT

An actuation system for deploying and retracting a lift assisting device of a wing of an aircraft, is presented. The actuation system includes a track pivotally coupled to the lift assisting device, a shaft rotating in response to flight control signals to deploy or retract the lift assisting device, means for actuating the lift assisting device between a retracted position and a deployed position along an arcuate path, a plurality of track roller bearings and a plurality of side roller bearings. The roller bearings rotatably contact the track to guide the track along the arcuate path. The track roller bearings are comprised of an outer ring, a split inner ring and liners disposed between bearing surfaces of the outer and the inner rings. The split inner ring is configured for accommodating deflection and bending of a mounting pin coupling the track roller bearing in proximity to the track.

7 Claims, 5 Drawing Sheets

ACTUATION SYSTEM FOR A LIFT ASSISTING DEVICE AND ROLLER BEARINGS USED THEREIN

CROSS-REFERENCE TO RELATED APPLICATIONS

This patent application is a continuation application of and claims priority benefit under 35 U.S.C. §120 to U.S. patent application Ser. No. 12/201,062, filed Aug. 29, 2008 now U.S. Pat. No. 8,025,257, which is a U.S. Utility Application of U.S. Provisional Application Ser. No. 60/992,746, filed Dec. 6, 2007 and to which priority benefit under 35 U.S.C. §119(e) is claimed, and both of which are hereby incorporated by reference in their entirety.

BACKGROUND OF THE INVENTION

1. Field of the Invention

This invention relates to roller bearing assemblies for use in critical applications and, more particularly, to improved roller bearing assemblies used within an actuation system of an aircraft assembly.

2. Description of the Related Art

It is well known to use bearings to reduce friction between moving parts of a mechanical assembly. Similarly, it is well known to use bearings that roll on a fixed track to extend a first component from a second component. One implementation of such a track style bearing is within a wing of an aircraft. For example, fixed wing aircraft typically include slats movably arranged along a leading edge of each wing and flaps movably arranged along a trailing edge of each wing. By selectively extending, retracting and deflecting the slats and flaps aerodynamic flow conditions on a wing are influenced so as to increase lift generated by the wing during takeoff or decrease lift during landing. For example, during take-off the leading edge slats are moved forward to extend an effective chord length of the wing and improve lift. During flight, the leading edge slats and trailing edge flaps are placed in a retracted position to optimize aerodynamic conditions.

Generally speaking, leading edge slat designs employ a series of roller style bearings that guide fixed tracks to extend the leading edge slats in order to increase lift at slow speed for landing and takeoff. The tracks may have multiple configurations such as, for example, general I-beam and PI-beam shapes. Since the tracks themselves are typically not overly robust in their construction, multiple load conditions may be realized by the track roller bearings. Similarly, side load rollers or pins typically slide against the track to assist in centering the main rollers on the track. The wing also includes actuation systems for positioning the slats and flaps. Actuation systems include, for example, drive motors (e.g., hydraulic or electric drive motors), drive shafts and other bearings such as spherical bearings, bushings and linkage bearings that assist in deployment and retraction of the slats and flaps. As can be appreciated, aircraft wing designs are being continually developed as engineers seek to improve aircraft performance while increasing system capabilities. Newer designs are tending to increase the number of systems employed within a wing cross section. Accordingly, space within the wing cross section is at a premium. Therefore, it is desirable to improve performance characteristics of components (e.g., to reduce maintenance) within the wing while also minimizing space needed for such components.

Based on the foregoing, it is the general object of this invention to provide an improved bearing for use in crucial applications.

SUMMARY OF THE INVENTION

The present invention resides in one aspect in an actuation system for deploying and retracting a lift assisting device of a wing of an aircraft. The actuation system includes a track pivotally coupled to the lift assisting device, a shaft rotating in response to flight control signals to deploy or retract the lift assisting device, means for actuating the lift assisting device between a retracted position and a deployed position along an arcuate path, a plurality of track roller bearings and a plurality of side roller bearings. The roller bearings rotatably contact the track to guide the track along the arcuate path. In one embodiment, the track roller bearings are comprised of an outer ring, a split inner ring and liners disposed between bearing surfaces of the outer and the inner rings. The split inner ring is configured for accommodating deflection and bending of a mounting pin coupling the track roller bearing in proximity to the track. In another embodiment, the track roller bearings are comprised of an outer race, an inner race and needle roller elements.

In one embodiment, the means for actuating includes a gear track coupled to the track and a pinion gear coupled to the shaft. The pinion gear has gear teeth that engage the gear track. When the shaft rotates in a first direction the pinion gear engages the gear track to move the lift assisting device from the retracted to the deployed position along the arcuate path. When the shaft rotates in a second direction the pinion gear engages the gear track to move the lift assisting device from the deployed position to the retracted position along the arcuate path. In another embodiment, the means for actuating includes an actuator arm coupled to the track and an actuator lever coupled to the shaft and to the actuator arm. When the shaft rotates in the first direction the actuator lever drives the actuator arm to move the track and the lift assisting device from the retracted to the deployed position along the arcuate path. When the shaft rotates in the second direction the actuator lever drives the actuator arm to move the track and the lift assisting device from the deployed position to the retracted position along the arcuate path.

In still another embodiment, each of the plurality of track roller bearings are comprised of an outer ring having inner bearing surfaces, an inner split ring having a first portion and a second portion, each of the first and second portions having outer bearing surfaces, and a plurality of liners disposed between the inner bearing surfaces of the outer ring and the outer bearing surfaces of the inner ring. Each of the inner rings is comprised of 17-4PH steel and each of the outer rings is comprised of AISI Type 422 stainless steel. In one embodiment, each of the outer rings is comprised of AISI Type 422 stainless steel with a special nitriding hardening process.

DETAILED DESCRIPTION OF PREFERRED EMBODIMENTS OF THE INVENTION

Figure 1:
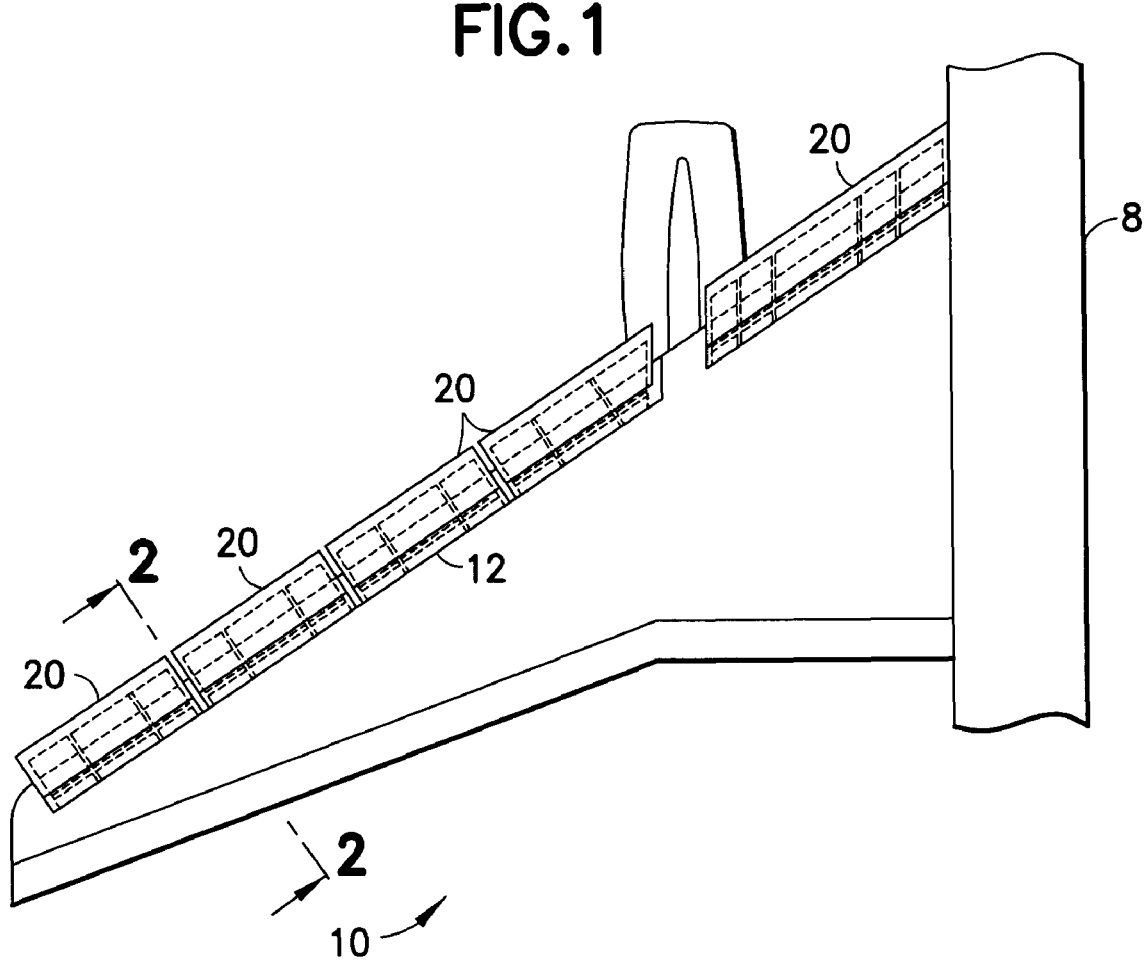
FIG. 1 is a plan view of a wing of an aircraft illustrating a plurality of slat panels located at a leading edge of the wing.
Figure 2:
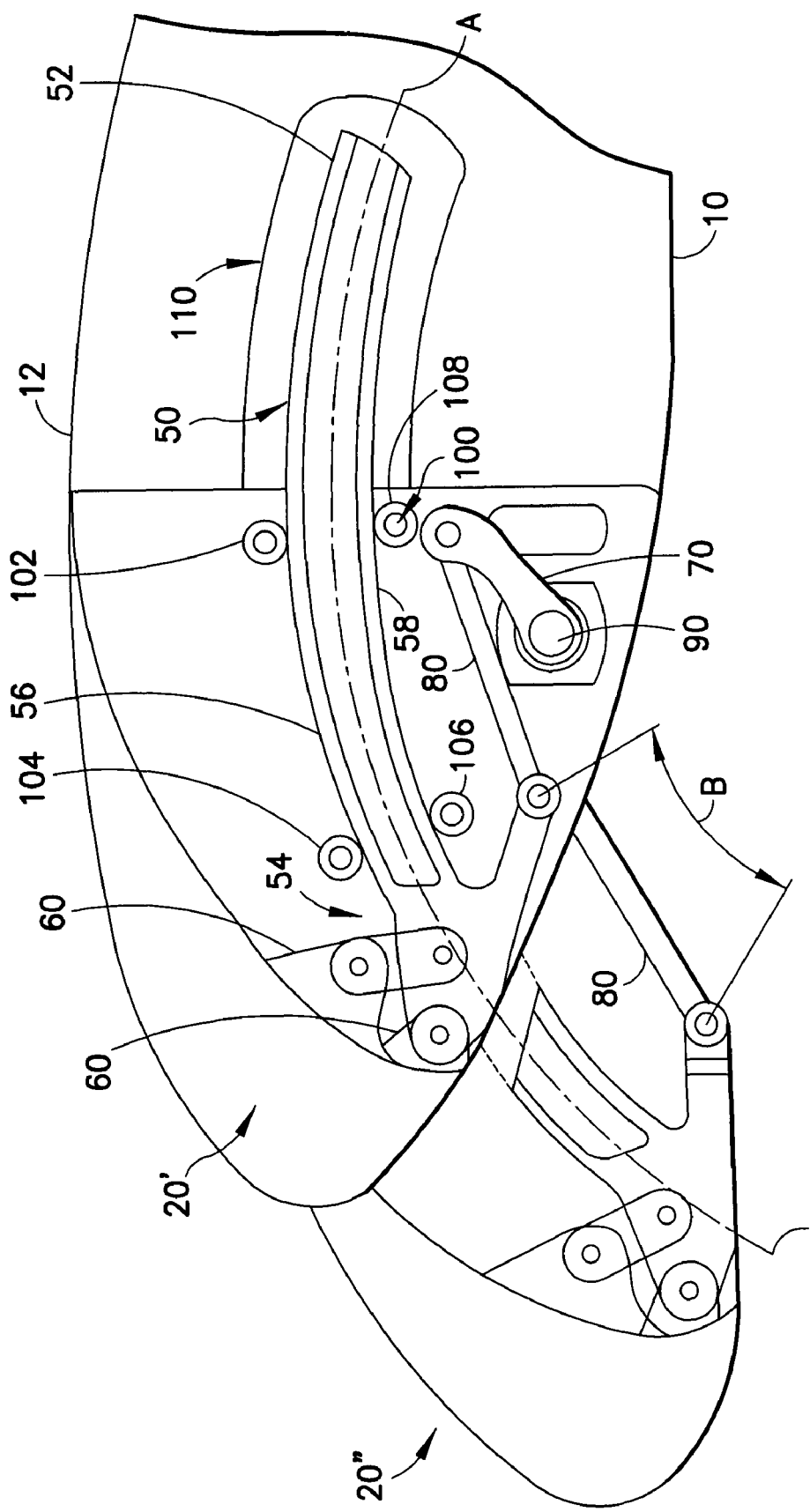
FIG. 2 is a side cross-sectional view of the wing of FIG. 1 taken along line 2-2 illustrating one of the slat panels in a deployed and a retracted position.

FIG. 1 provides a plan view of a leading edge section 12 of a wing 10 of an aircraft 8. The wing 10 includes a plurality of slat panels 20 deployed along the leading edge 12 of the wing 10. As described herein, an actuation system selectively extends and retracts the slat panels 20 relative to the leading edge 12 in response to flight control signals, as is generally known in the art. FIG. 2 is a partial cross-sectional view of the wing 10 taken along line 2-2 of FIG. 1 and illustrates one of the leading edge slats 20 in a retracted position 20' and in an extended position 20". As shown in FIG. 2, in the retracted position (e.g., flight position) the slat 20' is located against the leading edge 12 of the wing 10 and in the deployed position (e.g., take-off and landing position) the slat 20" is deployed downwardly and forwardly away from the leading edge portion 12 of the wing 10 thus increasing a surface area of the wing 10 to vary the wing's lift-enhancing characteristics.

An actuation system 40 of each slat 20 includes a track 50 extending along an arcuate axis A from a rear portion 52 to a forward portion 54. It should be appreciated that the track 50 may have multiple configurations such as, for example, an I-beam shape and a PI-beam shape. Generally speaking, webbing that constitutes support elements of the track is not overly robust. As such, multiple load conditions are experienced at the track during operation that may be carried and distributed by roller style bearings, as are described herein, to, for example, the wing structure of the aircraft.

As shown in FIG. 2, the forward portion 54 of the track 50 is pivotally coupled to an interior surface of the slat 20. In one embodiment, the track 50 is coupled to the slat 20 by means of, for example, linkage bearings 60. The actuation system 40 also includes an actuator lever 70. The actuator lever 70 is coupled to the track 50 via an actuator arm 80. The actuator lever 70 is also coupled to a shaft 90. As is generally known in the art, the shaft 90 extends along the leading edge section 12 of the wing 10 and operates a plurality of actuator levers (similar to lever 70) coupled to respective ones of the plurality of slat panels 20 in response to flight control commands to extend the slats when rotating in a first direction and to retract the slats 20 when rotating in a second direction.

A plurality of track roller bearings 100 are disposed about a first outer surface 56 and a second outer surface 58 of the track 50. The track roller bearings 100 are in rotational contact with the outer surfaces 56 and 58 of the track 50 to guide the track 50 in its arcuate path along axis A during deployment and retraction. The path of travel of the slat 20 is illustrated in FIG. 2 by arrow B. As shown in FIG. 2, the plurality of track roller bearings 100 includes a first pair of track roller bearings 102 and 104 and a second pair of track roller bearings 106 and 108. It should be appreciated that it is within the scope of the present invention to include more or less than the illustrated two pairs of roller bearings. For example, three roller bearings may be disposed about one or both of the first outer surface 56 and/or second outer surface 58 of the track 50. As described in detail below, it is also within the scope of the present invention for the plurality of track roller bearings 100 to include rolling element needle style track rollers or self lubricating style track rollers. In one embodiment, a mounting web 110 encloses at least a portion of the track 50. In one embodiment, the mounting web 110 extends into a fuel tank disposed within the wing of the aircraft.

Figure 3:
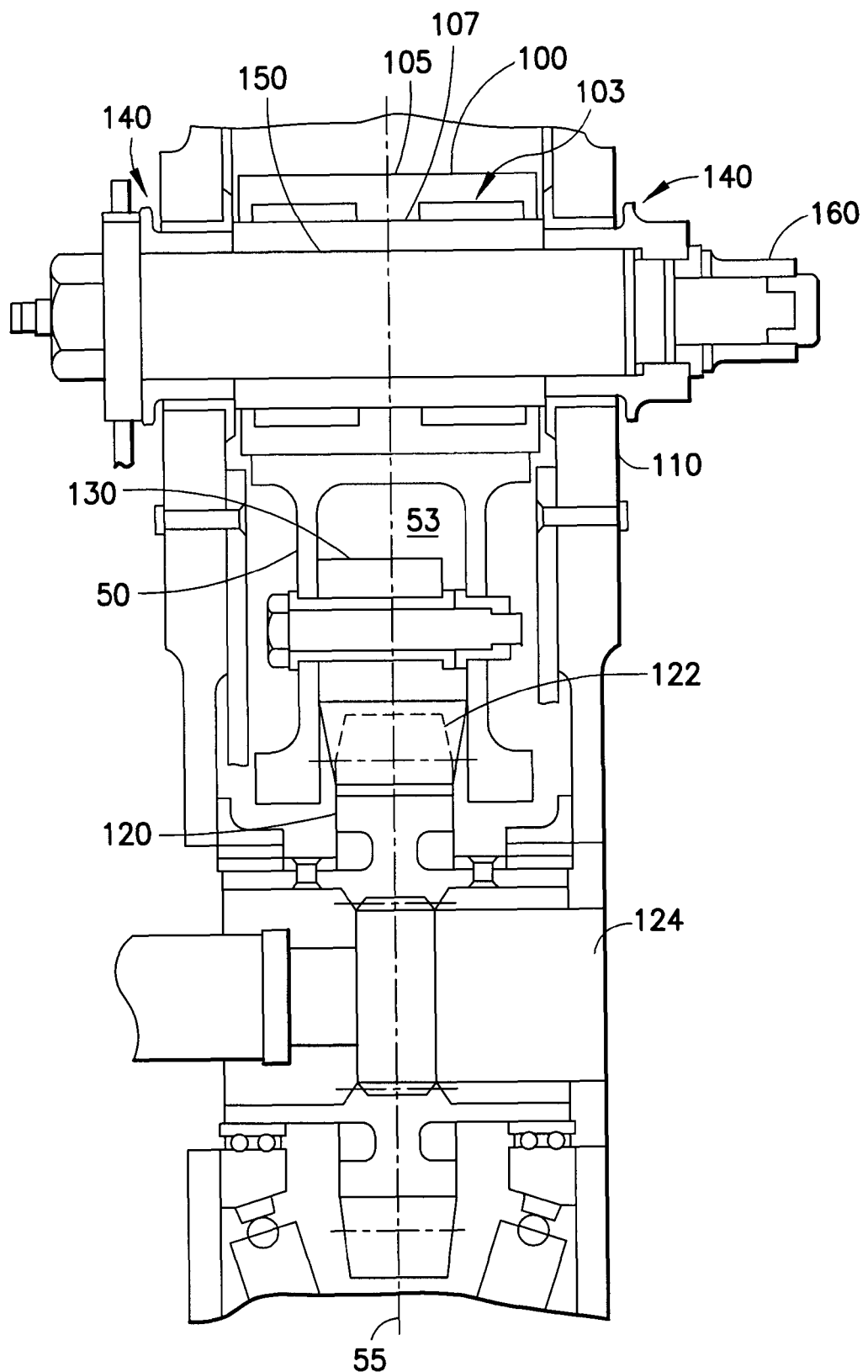
FIG. 3 is a front, partial cross-sectional view of a portion of the wing illustrating an actuation system for a slat panel, in accordance with one embodiment of the present invention.

In one embodiment illustrated in FIG. 3, the actuation system 40 includes a pinion gear 120 having teeth 122 that drive a gear track 130 disposed within an interior portion 53 of the track 50. Preferably, the gear track 130 is positioned on a vertical centerline 55 of the track 50. The pinion gear 120 is coupled to a shaft 124 (such as the shaft 90) that rotates in response to flight control commands. As the shaft 124 and the pinion gear 120 rotate, a drive force is provided to the gear track 130 for driving the track 50 along axis A between one of the retracted position 20' and the extended position 20" (FIG. 2). As shown in FIG. 3, the track roller bearing 100 is coupled to the mounting web 110 about the track 50. For example, as shown in FIG. 3, the track roller bearing 100 is coupled to the mounting web 110 above the track 50.

As shown in FIG. 2, the plurality of track roller bearings 100 are coupled to the mounting web 110 about the first and second outer surfaces 56 and 58 of the track 50 to support and guide the track 50 during deployment and retraction. In one embodiment, illustrated in FIG. 3, the track roller 100 is coupled to the mounting web 110 using opposing bushings 140, a mounting pin 150 and a nut 160. In one embodiment, the opposing bushings 140 are comprised of eccentric bushings and the nut 160 is comprised of a castellated nut to allow adjustment to the track 50 at fit-up. As shown in FIG. 3, the track roller bearing 100 includes a plurality of needle roller elements 103 (e.g., two rows of needle rollers in a double channel design). The needle roller elements 103 are lubricated with grease such as, for example, Aeroshell 33, Mobil 28, Aerospec 200 or Aeroplex 444 as is required by predetermined maintenance procedures. In one embodiment, an outer ring 105, an inner ring and 107 and needle rollers 103 of the track roller bearings 100 are comprised of hardened stainless steel such as, for example, 440C, 52100, 422 stainless with a special nitriding process (AeroCres®)(AEROCRES is registered trademark of RBC Aircraft Products, Inc., Oxford, Conn. USA), XD-15NW, and Cronidur 30.

Figure 4:
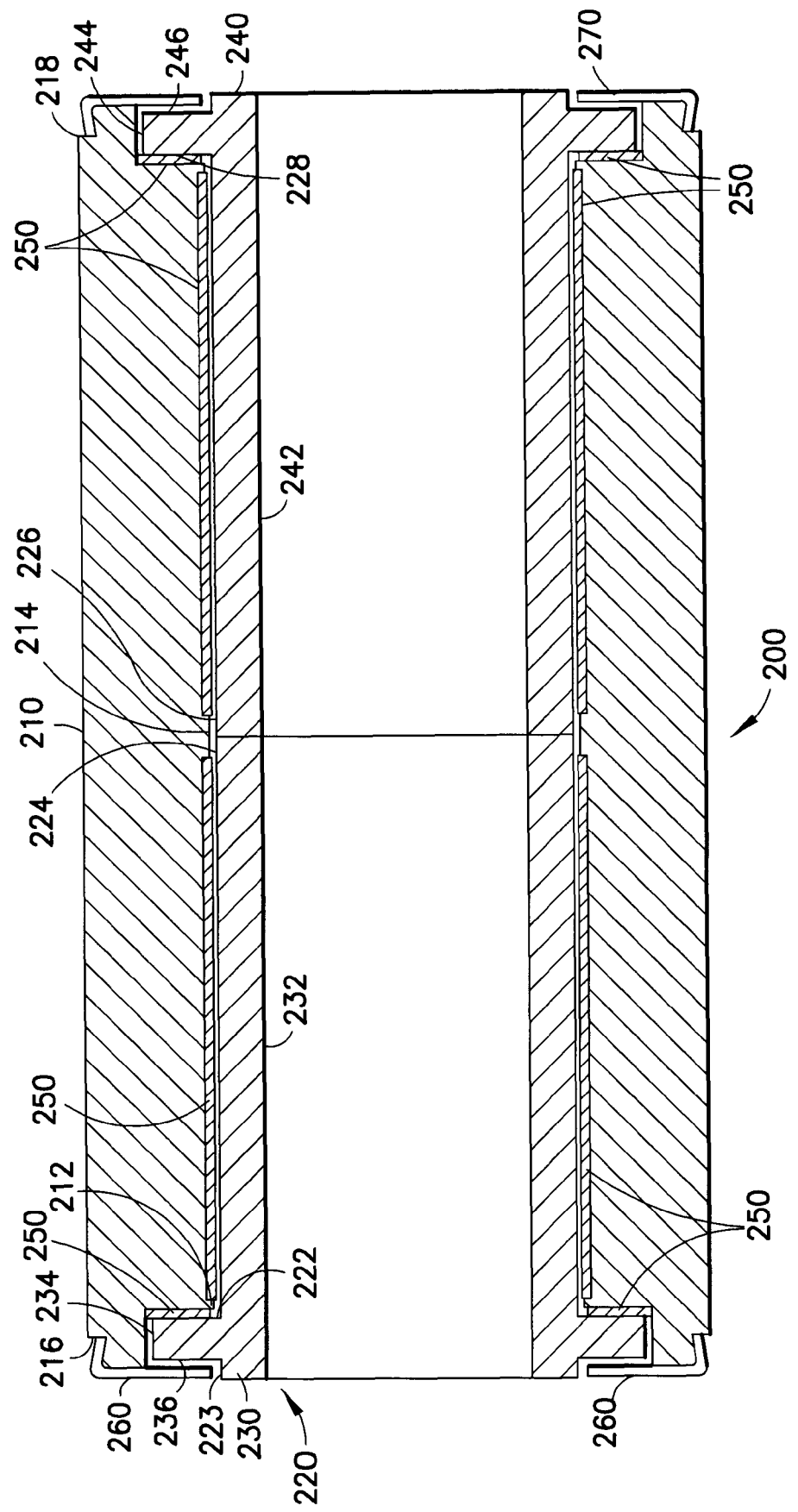
FIG. 4 is a cross-sectional view of a track roller bearing in accordance with one embodiment of the present invention.

In another embodiment, illustrated in FIG. 4, the track roller bearing 100 is comprised of a lined track roller assembly 200 including an outer ring 210 and an inner ring 220. The inner ring 220 is a split ring including a first portion 230 and a second portion 240. In one embodiment, the first portion 230 and the second portion 240 include respective body portions 232 and 242 as well as head portions 234 and 244. The head portions 234 and 244 include flanges 236 and 246, respectively. In accordance with the present invention, the split ring configuration of the first portion 230 and the second portion 240 due to their ability to deflect relative to one another, accommodate potential deflection and/or bending of the mounting pin 150 from stresses that may be encountered during, for example, aircraft takeoff and landing. As can be appreciated, unless accounted for a bending of the mounting pin 150 may result in high friction or binding of the track roller 100 or 200 and a failure to deploy or retract slats in response to flight control commands. The flanges 236 and 246 control axial motion of the outer ring 210 to substantially eliminate contact of the outer ring 210 and the opposing bushings 140 utilized to mount the track roller 100 and 200 within the mounting web 110.

As shown in FIG. 4, the lined track roller assembly 200 may also include liners 250 disposed between bearing surfaces 212, 214 of the outer ring 210 and bearing surfaces 222, 224, 226 and 228 of the inner ring 220. In one embodiment, the liners 250 are constructed of polytetrafluoroethylene (commercially available under the designation TEFLON®) (TEFLON is a registered trademark of E.I. DuPont De Nemours and Company, Wilmington, Del. USA), polyester, graphite, fabric impregnated with a polymer, urethane, polyimide, epoxy, phenolic or other type of resin. In one embodiment, the liners 250 are molded and are comprised of polytetrafluoroethylene (TEFLON®), polyester, graphite, fibers in a thermosetting composite resin made from polyester, urethane, polyimide, epoxy, phenolic or other type of resin. In one embodiment, the outer ring 210 and the inner ring 220 is comprised of hardened stainless steel such as, for example, 440C, 52100, Custom 455®, Custom 465® (CUSTOM 455 and CUSTOM 465 are registered trademarks of CRS Holdings, Inc., Wilmington, Del., USA), and corrosion resistance steel such as 17-4PH, 15-5PH and PH13-8Mo.

In one embodiment, the lined track roller assembly 200 also includes shields 260 and 270 disposed about shoulder portions 216 and 218 of an outer diameter of the outer ring 210 and extending to an outer diameter 223 of the inner ring 220. The inventors have discovered that the shields 260 and 270 reduce friction and discourage dust and other contaminates from entering and compromising contact between the bearing surfaces 212, 214 of the outer ring 210 and bearing surfaces 222, 224, 226 and 228 of the inner ring 220.

Figure 5:
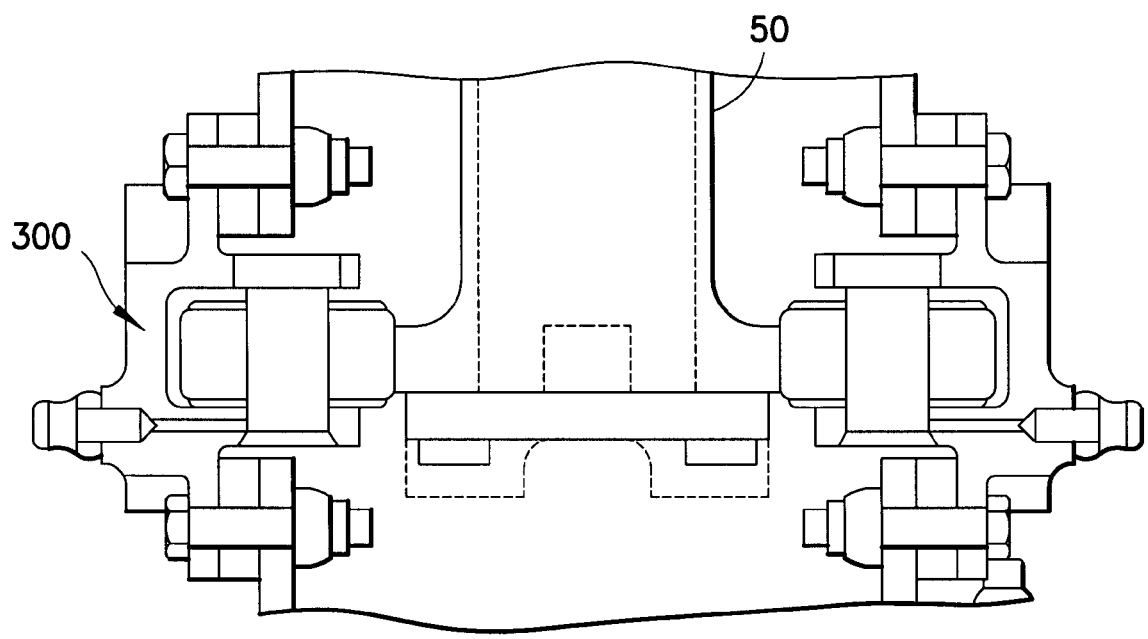
FIG. 5 is a front, partial cross-sectional view of a portion of the wing illustrating side guide roller bearings in accordance with one embodiment of the present invention.

In one embodiment, illustrated in FIG. 5, a plurality of side guide roller bearings 300 are disposed about opposing sides of the track 50. The side guide roller bearings 300 are in rotational contact with the opposing side surfaces of the track 50 to guide the track 50, along with track roller bearings 100 and 200, in its arcuate path along axis A during deployment and retraction. In one embodiment, the plurality of side guide roller bearings 300 are in rotational contact with wear pads affixed to the track 50. In one embodiment, the plurality of side guide roller bearings 300 include needle roller bearings having outer races, inner races and needle rollers constructed of hardened stainless steel such as, for example, 440C, 52100, 422 stainless with a special nitriding process (e.g., the aforementioned AeroCres® process), XD-15NW, and Cronidur 30. In yet another embodiment, the side guide roller bearings 300 include end washers and seals. The end washers are constructed of, for example, 52100 steel with cadmium plate or 420 stainless steel. The seals are made from a thermoplastic such as, for example, an acetal copolymer with lubricant fillers or Delrin®/Celcon® (DELRIN is a registered trademark of E.I. DuPont De Nemours and Company, Wilmington, Del. USA, and CELRON is a registered trademark of CNA Holdings, Inc., Summit, N.J. USA). The seals retain grease and prevent of ingress dirt, dust and other contaminates into the bearings 300. In one embodiment, needle roller elements of the bearings 300 are lubricated with grease such as, for example, Aeroshell 33, Mobil 28, Aerospec 200 or Aeroplex 444 as is required by predetermined maintenance procedures.

As described above, both the rolling element track bearings 100 and self lubricating track roller bearings 200 include a hard outer ring or race to work in harmony with the mating track 50 that the bearings roll against. In one embodiment, the track 50 is comprised of titanium or steel. In one embodiment, the track 50 may be coated with a material such as, for example, tungsten carbide, although a coating is not a requirement of the present invention.

In addition to a unique bearing mounting configuration, another aspect of the present invention is related to the materials from which the bearings are manufactured. Historically, lined track bearings are manufactured from relatively soft materials. For example, inner rings are typically comprised of precipitation-hardening martensitic stainless steel such as, for example, 17-4PH steel, having a Rockwell hardness in a range of about HRc 30s to about HRc 40s, while outer rings are typically comprised of precipitation-hardening stainless steel such as, for example, custom 455 steel, having a Rockwell hardness in the range of about HRc 40s. Outer rings may also be manufactured as through hardened high strength steel having a Rockwell hardness of in the range of about HRc 50s to avoid flats that can occur. 440C steel has also been used for outer rings. The inventors have discovered that, in certain applications, it is beneficial to maintain inner rings manufactured from 17-4PH steel, and that it is desirable to manufacture outer rings of AISI Type 422 stainless steel. In one embodiment, each of the outer rings is comprised of AISI Type 422 stainless steel with a special nitriding hardening process (e.g., the aforementioned AeroCres® process). Outer rings comprised of AISI Type 422 stainless steel with AeroCres® hardening are preferred for superior corrosion resistance and performance as compared to conventional outer rings manufactured of 440C steel.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. An actuation system for deploying and retracting a lift assisting device of a wing of an aircraft, the actuation system comprising:
    a track pivotally coupled to the lift assisting device, the track having first and second outer surfaces and side surfaces;
    a shaft rotationally coupled within the wing of the aircraft and operable, in response to flight control signals, to deploy or retract the lift assisting device;
    means for actuating the lift assisting device, coupled to the shaft, between a retracted position to a deployed position along an arcuate path;
    a plurality of track roller bearings rotatably contacting the first and second outer surfaces of the track to guide the track along the arcuate path; and
    a plurality of side roller bearings rotatably contacting at least one side of the track to guide the track along the arcuate path,
    wherein the plurality of track roller bearings includes at least one track roller bearing having two rows of needle rollers in a double channel design and at least one lined track roller assembly.

2. The actuation system of claim 1, wherein the means for actuating is comprised of:
    a gear track coupled to the track; and
    a pinion gear coupled to the shaft, the pinion gear having gear teeth that engage the gear track;
    wherein when the shaft rotates in a first direction the pinion gear engages the gear track to move the lift assisting device from the retracted to the deployed position along the arcuate path, and when the shaft rotates in a second direction the pinion gear engages the gear track to move the lift assisting device from the deployed position to the retracted position along the arcuate path.

3. The actuation system of claim 1, wherein the means for actuating is comprised of:
    an actuator arm coupled to the track; and
    an actuator lever coupled to the shaft and to the actuator arm;
    wherein when the shaft rotates in a first direction the actuator lever drives the actuator arm to move the track and the lift assisting device from the retracted to the deployed position along the arcuate path, and when the shaft rotates in a second direction the actuator lever drives the actuator arm to move the track and the lift assisting device from the deployed position to the retracted position along the arcuate path.

4. The actuation system of claim 1, wherein the plurality of track roller bearings includes at least one track roller bearing in rotational contact with an upper surface of the track and at least one track roller bearing in rotational contact with a lower surface of the track.

5. The actuation system of claim 1, wherein the actuation system further includes a mounting web enclosing at least a portion of the track and wherein the plurality of track roller bearings are coupled to the mounting web.

6. The actuation system of claim 5, wherein the track roller bearings are coupled to the mounting web with opposing bushings, a mounting pin and a nut.

7. The actuation system of claim 6, wherein the opposing bushings are comprised of eccentric bushings and the nut is comprised of a castellated nut to allow adjustment to the track at fit-up.

\* \* \* \* \*